July 16, 1929.　　　　　H. MARLES　　　　　1,720,911
STEERING GEAR FOR MECHANICALLY PROPELLED VEHICLES AND THE LIKE
Filed Dec. 19, 1922　　　2 Sheets-Sheet 2
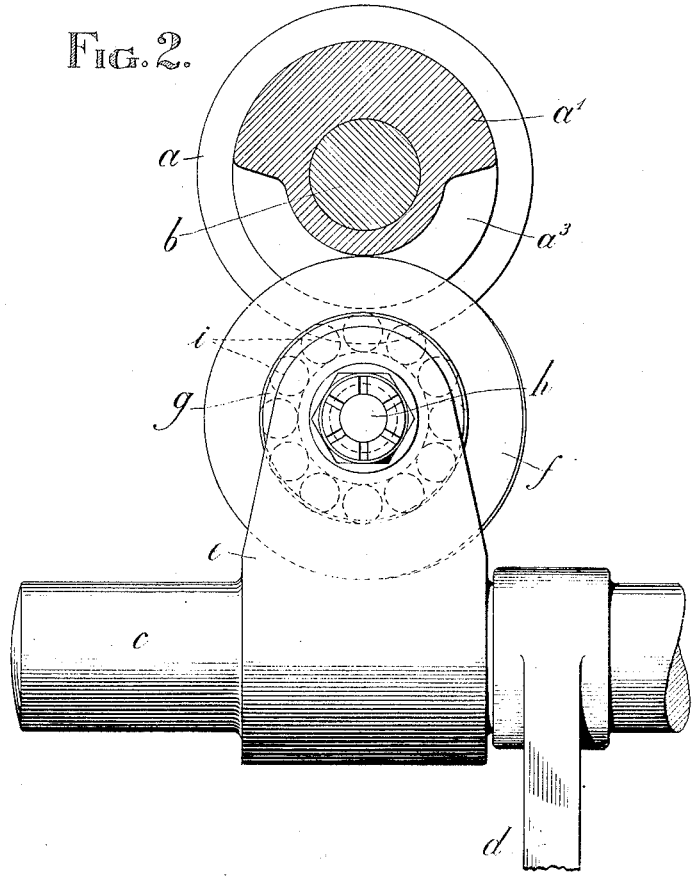
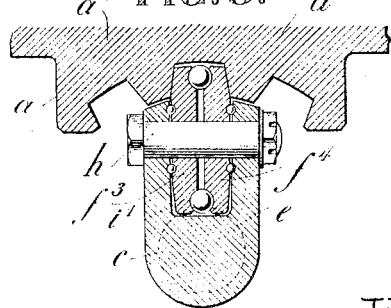
Henry Marles
INVENTOR
BY E. G. Siggers
ATTORNEY

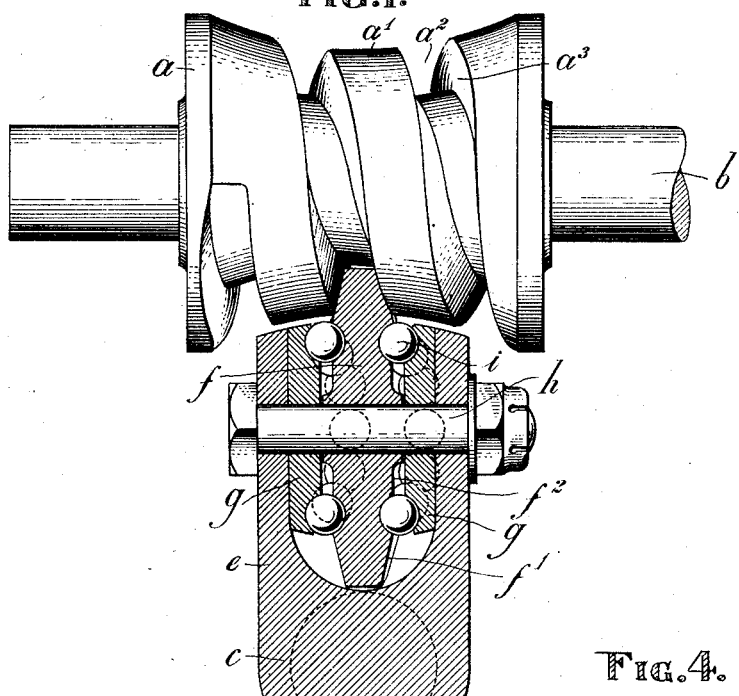
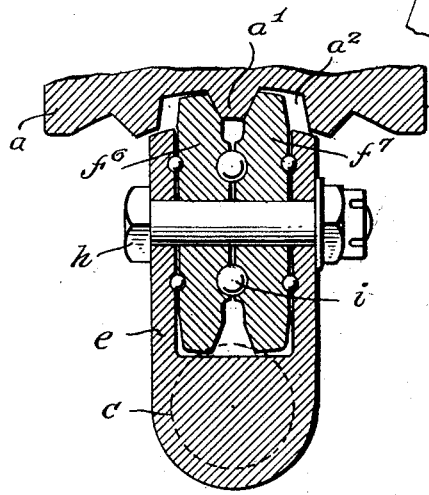
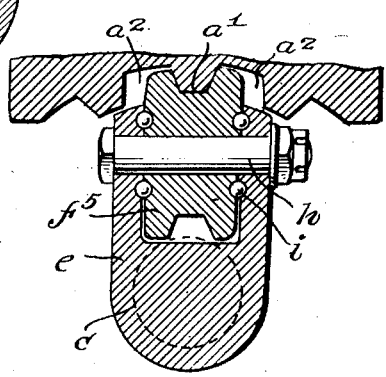
Henry Marles
INVENTOR

Patented July 16, 1929.

1,720,911

UNITED STATES PATENT OFFICE.

HENRY MARLES, OF LONDON, ENGLAND, ASSIGNOR TO THE MARLES STEERING GEAR COMPANY OF AMERICA, INCORPORATED, OF NEW YORK, N. Y., A CORPORATION OF NEW YORK.

STEERING GEAR FOR MECHANICALLY-PROPELLED VEHICLES AND THE LIKE.

Application filed December 19, 1922, Serial No. 607,912, and in Great Britain January 21, 1922.

This invention refers to improvements in or relating to steering gear for mechanically propelled vehicles or the like, and it relates generally to steering gear of the kind described in the specifications of Patent No. 1,189,985 and applications Serial Nos. 415,927 and 503,724. In the specifications of these prior patents steering gear is described in which either a pair of rollers or a single roller carried by a rocker shaft engages a cam or cams on the steering column.

Now according to the present invention I provide on or operated by the rotatable steering column a helical cam or worm, the threads of which increase in diameter as it progresses upwardly and downwardly from the point of smallest diameter and I provide on the rocker shaft one or more rollers adapted to mesh therewith or engage the said cam with the marginal portions of their side faces, the roller or rollers being mounted with their axis or axes parallel or nearly parallel to the axis of the steering column when in mid position as when the parts are placed for driving straight ahead, but conveniently departing from parallelism by an angle equal to the mean angle of the thread of the cam or worm. By this construction I am enabled to ensure great strength and simplicity of construction, to reduce considerably the lateral dimensions of the gear, to reduce considerably the stresses on the parts and ball races or bearings, and also to provide an arrangement in which two, three or more complete revolutions of the steering hand wheel can be obtained between the left and right full lock positions of the steering road wheels, and also the ratio of motion can be made equable throughout or variable as may be preferred.

In order that the present invention may be clearly understood and more readily carried into effect it is hereinafter described with reference to the accompanying drawings, in which:—

Figure 1 is a sectional side elevation of steering gear constructed in accordance with the present invention;

Figure 2 is a sectional plan view thereof;

Figure 3 is a detail view substantially corresponding to that shown in Figure 1, but showing a double roller on the rocker shaft;

Figure 4 is a detail view illustrating a slightly modified form of gear in which a grooved roller is provided to engage one of the threads of the cam;

Figure 5 is a similar view to Figure 4, illustrating two slightly spaced rollers for accomplishing the same purpose.

In order that the present invention may be more clearly understood, it is hereinafter described in one of its simplest adaptations, illustrated in Figure 1, in which a double helical cam or worm $a$ giving, say, three revolutions is mounted at or near the lower end of the steering column $b$. This double helical cam or worm $a$ the thread of which increases in diameter as it progresses upward and downward from the point of smallest diameter or mid position thereof, is provided with threads $a'$ and spaces $a^2$ between said threads $a'$ of frusto-conical or spur wheel tooth-shaped cross section, the threads $a'$ and the spaces $a^2$ between same conveniently being of equal width, and the depth conveniently being approximately equal to the width or a trifle more. Mounted on a rocker shaft $c$ carrying the drop arm $d$ of the steering gear is an arm or forked member $e$ carrying a single roller $f$ which is so bevelled or otherwise shaped at the marginal or circumferential portion $f'$ of its side faces $f^2$ as neatly to enter the space $a^2$ between the threads $a'$ and engage the juxtaposed sides $a^3$ of two adjacent threads $a'$, the arrangement being such that the axis of the rocker shaft $c$ is mounted as heretofore in a plane at right angles to the axis of the steering column $b$, but such that the axis of the roller $f$ is parallel or substantially parallel to the axis of the steering column $b$ when the parts are, as shown, in their mid positions as when driving straight ahead, but such also that the axis of the roller is at right angles or substantially at right angles with the pitch angle of the thread of the cam or worm. The roller itself $f$ may be mounted between plain, ball or roller bearings $i$ as may be desired. Conveniently it may, as indicated, be secured between a pair of flat discs $g$ having ball races formed therein to co-operate with corresponding ball races formed on the outsides $f^2$ of the roller $f$ and the said roller $f$, together with the said bearing disc $g$, may be secured in place between the arms of the forked arm $e$ on the rocker shaft by means of a single bolt or pivot pin $h$.

In a slightly modified arrangement, shown in Figure 3, instead of providing such a gear with a single roller, a double roller $f^3$ $f^4$ may be employed and arranged as before, to engage between two adjacent threads $a'$ of the double helical cam or worm and having balls $i'$ in between the half sections thereof.

In a further slightly modified arrangement, shown in Figure 4, we may provide a grooved roller $f^5$ or two slightly spaced rollers $f^6$ $f^7$, as shown in Figure 5, adapted to engage one on each side of a single thread $a'$ of the double helical cam or worm.

A feature of this invention which is quite essential is that the roller element always presents two marginal portions of its side faces to the cam, and this is true whether the roller element is formed in one piece, as in Figures 1 and 4, or in two parts, as in Figures 3 and 5.

In the claims I shall use the term "roller element" in referring to the single or double rollers; formed in one instance of a single disk and in the other of a pair of disks placed side by side and acting for all purposes as a single roller.

In both forms of the invention I employ only one roller tooth, made up in one instance of a single disk and in the other of two disks, and make the faces straight and obtain a line contact between the roller edge and worm track face. The straight sided roller with its wedge section tooth edge is the essential feature of this invention. It not only gives greater contact, but lends itself to setting up into closer engagement with the worm after wear.

In all of the above-described arrangements the bolt or pivot pin $h$ of the roller $f$ may be made slightly eccentric so as to obtain a ready and accurate adjustment of the roller in the groove in the cam or worm.

What I claim is:—

1. In a steering gear the combination with a rotatable steering column, of a worm of the hour glass type mounted on said column, a rock shaft and a roller element on said rock shaft having a single pair of oppositely facing surfaces in pressure rolling contact respectively with corresponding oppositely facing surfaces of the worm.

2. In a steering gear the combination with a rotatable steering column, of a worm of the hour glass type mounted on said column, a rock arm and a roller element on said rock arm having a single pair of oppositely facing conical surfaces in pressure rolling contact respectively with corresponding oppositely facing helical surfaces of the worm.

3. In a steering gear, the combination with a rotatable steering column, of a worm gear of the hour glass type mounted thereon, a rock arm and a roller element mounted at the free end of said rock arm provided with oppositely facing conical surfaces in wedge engagement and rolling contact with corresponding oppositely facing helical surfaces of the worm whereby lost motion between the steering column and rock shaft is eliminated.

In testimony whereof I hereunto signed my name.

HENRY MARLES.